MAGNETIC COUPLING DEVICES

Filed March 30, 1954 2 Sheets-Sheet 1

INVENTOR.
William D. Macgeorge
BY Frank H. Borden
ATTORNEY

Sept. 2, 1958 W. D. MACGEORGE 2,850,686

MAGNETIC COUPLING DEVICES

Filed March 30, 1954 2 Sheets-Sheet 2

INVENTOR.
William D. MacGeorge.

BY Frank H. Borden
ATTORNEY 2,850,686

MAGNETIC COUPLING DEVICES

William D. Macgeorge, Lansdale, Pa., assignor to Automatic Timing Controls, Inc., a corporation of Pennsylvania Application March 30, 1954, Serial No. 419,785

6 Claims. (Cl. 317—171)

This invention relates to magnetic coupling devices, and particularly to devices having a part movable in response to the movement of a magent on a fixed path, with the part movable as a predetermined function of the movement of said magnet on its path.

In its broadest aspects the invention incorporates with a movable magnet movable on a fixed path, an armature or the like movable generally transversely of said path and forming a magnetic couple exerting a variable force having non-linear characteristics, and supplemental magnetic means having non-linear characteristics opposing the force of the couple, with the relative non-linearities in opposition so that the non-linearities substantially cancel and the movement of the armature becomes a linear function of the movement of the movable magnet. As will appear, although linearity is preferred, the invention is such as to effect other predetermined functions which are non-linear.

It is among the objects of this invention to provide a motion reducer utilizing a magnetic couple for converting a relatively large motion into a relatively small motion in functional relation and developing a signal functional with the small motion; to provide magnetic means movable from zero or datum on a substantially fixed path of relatively large range in response, for instance, to the change of condition of a variable from zero or datum, which path is in juxtaposition to a complemental magnetic device having an effective pivot upon which it can move generally toward or from said path and with which device the magnetic means has a magnetic coupling varying non-linearly in force as the magnetic means moves on its path from datum and the magnetic device moves on its effective pivot, and means for exerting an opposing force on said magnetic device varying non-linearly as the magnetic device moves on its pivot toward said path, the non-linearities being opposite and effectively cancelling, whereby the movement of the magnetic device on its pivot is a linear function of the movement of the magnetic means on its path from datum; to provide a pivoted magnetic device positioned on its pivot as a balance of opposing magnetic forces; to provide magnetic means movable on a fixed path of motion in response to change in condition of a variable, with complemental magnetic means juxtaposed to and generally parallel to said path and substantially coextensive therewith and having a substantial pivot upon which it can move, with means developing a force opposing the force of the magnetic couple between the magnetic and complemental means as the magnetic means moves on its path, in such manner as to establish the position of said complemental means on its effective pivot as a balance of opposing forces, said force-developing means comprising a magnet, or a spring, or both, whereby the opposing force increases with the increase in the effective force of the magnetic couple between the magntic and complemental means; to provide apparatus whereby motion of one part on a relatively large range effects motion of another part on a relatively small range, and to utilize the motion of said other part to produce an electrical signal proportional in magnitude to the motion of said one part; to provide magnetic means movable on a path, and complemental magnetic means generally coextensive and parallel with said path, having an effective pivot toward one end of said path so that movement of the magnetic means from juxtaposition to said pivot develops a magnetic couple between the magnetic and complemental means, of increasing force-effectiveness on the complemental means functional with the degree of such movement, and supplemental magnetic means mounted on said complemental means movable therewith toward a magnet of the same polarity to develop a repulsion-magnetic force opposing movement of the complemental means in response to the force of said magnetic couple, whereby the complemental means is disposed on its pivot as a balance of opposing magnetic forces and as a direct proportion of the setting of said magnetic means in its positioning relative to said one end of the path; to provide a movable element, exposed in one direction to a non-linearly developing force dependent for its magnitude upon the motion of a device on a relatively wide path of motion, and, in the other direction, to a non-linearly developing force opposing the first and dependent upon the degree of motion of the movable element, whereby the non-linearities are in opposite senses from the proportional and cancel, and the position of the movable element is a proportional function of the setting of the element movable on the wide path; to improve the art of motion followers; to provide a motion reducer responsive to changes of condition of a variable which imposes inappreciable load or drag on the variable response and therefore enhances accuracy; to reduce the cost and complication of motion reducers; and to provide other objects and advantages as will become more apparent as the description proceeds.

In the drawings forming part of this description:

Figures 1, 3, 4:
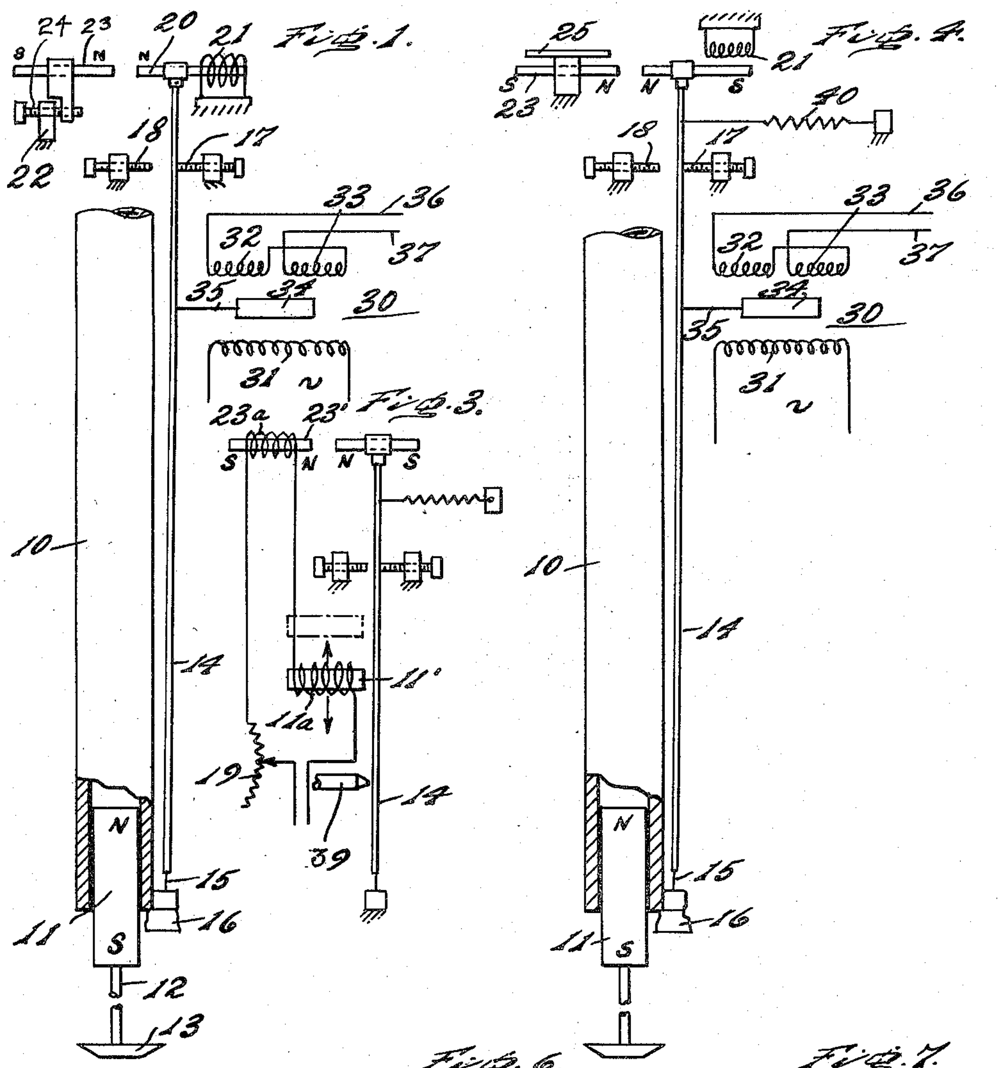
Fig. 1 represents a schematic diagram of a system according to a preferred form of the invention, utilizing variable magnetic repulsion as the means for balancing the variable effective force of the magnetic couple between the long-range movable element and the short-range pivotal element.
Figure 2:
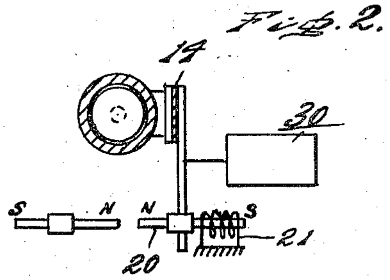
Fig. 2 represents a diagrammatic transverse section therethrough.

Fig. 3 represents a fragmentary diagrammatic elevation of a modified form of the system of Fig. 1, in which electromagnetic means are used both for the movable path following magnetic means and for the opposing repulsion force, in series so that line voltage fluctuations are of no effect on the positioning of the armature element, and with the movable armature controlling the bleed rate from a nozzle supplied by instrument air pressure.

Fig. 4 represents a diagram similar to that of Fig. 1, in which both magnetic repulsion and a spring are used for forces opposing that of the magnetic couple.

Figure 5:
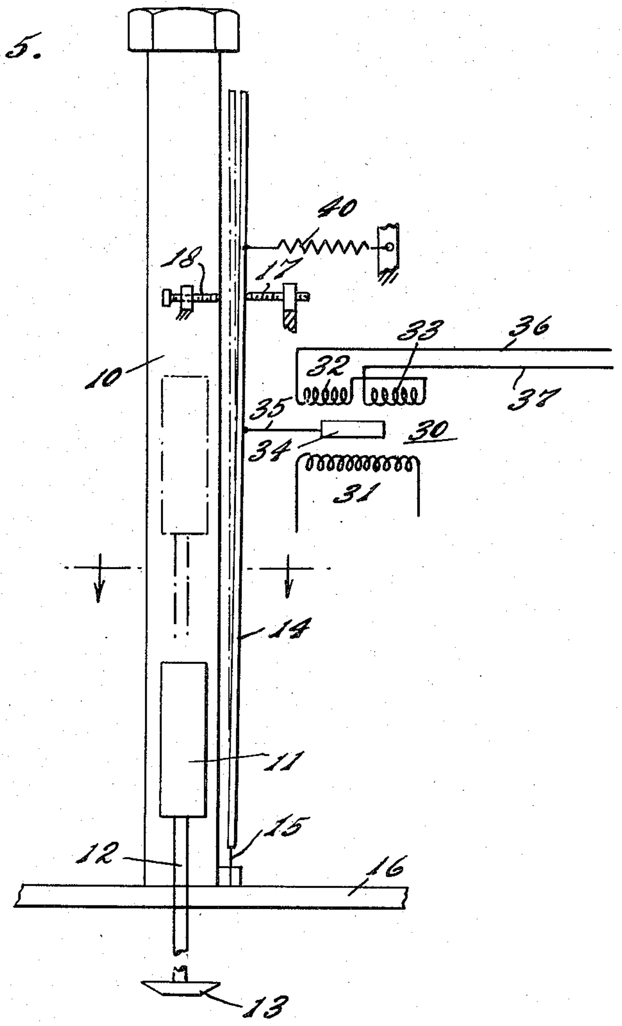

Fig. 5 represents a diagram similar to that of Fig. 1, in which a spring is the force means opposing the magnetic couple.

Figure 6:
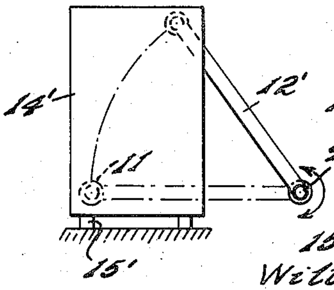

Fig. 6 represents a diagram of a modified form of the device responsive to angular motion with a linearly developing positioning of the complemental magnetic element.

Figure 7:
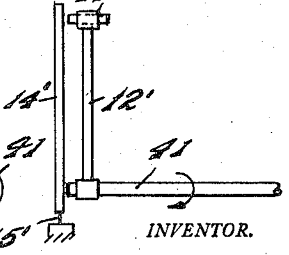

Fig. 7 represents a diagrammatic side elevation of the angular motion device of Fig. 6.

Figure 8:
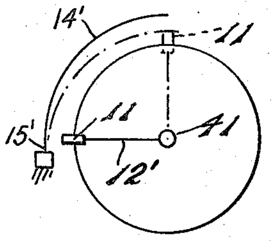

Fig. 8 represents a diagrammatic elevation of a modified form of angular motion device.

Figure 9:
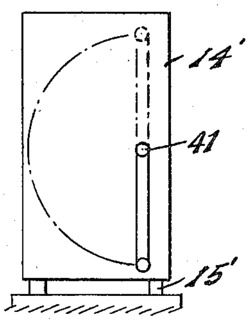

Fig. 9 represents a diagrammatic elevation of a still further modified form of angular motion by which a sine function can be derived.

Figure 10:
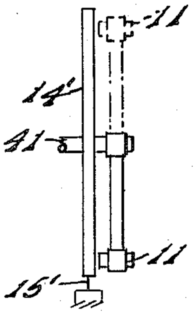

Fig. 10 represents a side elevation thereof.

Figure 11:
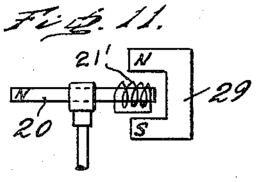

Fig. 11 represents a fragmentary diagrammatic elevation of a modified form of oscillation-damping device for the system.

The part having the relatively wide range of motion, whether in angular motion, or in linear motion, as is preferred, may be actuated functionally by and with changes in any associated variable, such as by the variable positioning of an element of an apparatus, or by any variable having a range of condition changes adequate to effect a long stroke, as, for instance, by association with a float disposed for movement in response to change in liquid level, as in liquid level devices for tanks or boilers or the like in the preferred linearly movable form of the invention. It is, of course, equally available for changes in float level due to changes in rates of fluid flow, as in rotameters or the like. In angular motion it may be a shaft having an oscillation as a function of motion of a part of an apparatus or mchine, which positions the magnet.

In a preferred, but illustrative case, illustrated in Figs. 1, 4, and 5, a permanent magnet unit 11 is mounted, by rod 12, on a float 13 for movement vertically with the float on a linear path. For convenience the path may be defined by the guiding tube 10, with which the magnetic unit 11 has slidable guided association. It will be understood that the central axis of the permanent magnet 11, in moving on the linear path does not need to be guided by a tube 10, but may be guided by passage of the rod 12 through a bushing or the like (not shown), so that magnet 11 moves in a linear path without any enclosure. If the tube 10 is used, as will generally be the case, it will be of non-magnetic material, such as of non-magnetic stainless steel, glass, or the like. In use on rotameters or the like there will usually be a tube 10 provided for communication with the rotameter tube (not shown), so as to impose the minimum resistance to magnet movement and thus to minimize load reactions on the float, which is thereby maintained at the proper setting for each liquid level in a tank, or consonant with each rate of flow through the rotameter tube.

A typical and presently preferred utilization of the invention is in liquid level, in which there is a datum level with relation to which the float, and therefore the magnet 11, has a range of motion, which, for purely illustrative instance, may comprise five inches of stroke or level change.

Adjacent to the tube 10, or to the path of travel of the magnet 11, a complemental pivotally movable magnetic armature element 14 is disposed, in general parallelism with the path of travel of the magnet 11, and, in length at least, coextensive with the length thereof. It is preferred that the unit 11 be a permanent magnet and the element 14 comprises an armature of magnetic material, so that with the unit laterally juxtaposed to the element, a magnetic couple exists, exerting a force between them urging the element toward the magnet 11. The element 14 has at one end an effective pivot, which may comprise an anti-friction actual pivot, but which preferably comprises a flexure mount 15. The pivot at 15 is horizontal and generally tangent to the tube so that the movement of element 14 is with its longitudinal axis in a vertical plane diametric of the tube and containing the axis of the magnet 11. The flexure mount 15 and the remaining elements to be described are mounted on a base plate 16 disposed for vertical adjustments to establish an accurate zero for the instrument.

It is preferred that the armature 14, in all forms of the invention, be positively limit-stopped to define a short path of oscillation on its pivot. To this end adjustable stop 17 is mounted outwardly of the armature element 14, and adjustable stop 18 is mounted inwardly thereof. In all forms of the device except that of Fig. 5, at a suitable point toward or on the free end of the armature 14, a magnet 20 is mounted, preferably comprising a permanent rod or bar magnet, preferably projecting in both directions normal to the armature 14. Magnet 20 may be mounted for variable setting in spacing from the pivot 15 for calibration of the instrument. On a suitable fixed support 22, a complemental magnet 23 is mounted in general axial coextension with the magnet 20 but in carefully spaced relation thereto. As shown in Fig. 1, a vernier adjustment screw 24 is provided by which the spacing of magnet 23 from magnet 20 can be varied in small increments. The same general effect can be achieved by introducing small rods of magnetic material into the flux path of magnet 23, by the juxtaposition of a selected small rod 25 beside the magnet 23 to weaken the magnetic effects of the latter, as shown in Fig. 4. Of course, the same effects may be obtained by adjustment of magnet 20. Although magnet 23 may be preferred to be comprised of a permanent magnet as shown in Figs. 1, 4, and 5, it may equally well be an electro-magnet as shown at 23' in Fig. 3. Similarly, the path-traversing magnet 11 is preferably a permanent magnet, but it may also comprise an electromagnet as shown at 11' in Fig. 3. In this latter case the coil **11*a* of magnet core 11' and the coil 23*a* of magnet core 23' are in series with a voltage source, adjustable through a potentiometer 19**.

It will be noted that the juxtaposed spaced ends of magnets 20 and 23 are of the same polarity, so that there is magnetic repulsion between them, increasing inversely as the square of the distance between them as the juxtaposed ends approach each other, and diminishing by the same factor as the juxtaposed ends move from each other.

It is highly desirable to damp the oscillations of the armature to smooth and stabilize its movements, and to this end various means may be used. One simple and effective manner of achieving this result is by using the opposite end of the magnet 20 for eddy current braking. As shown in Figs. 1 and 4, a fixed short circuited coil 21 closely surrounds the end of magnet 20. If desired, this damping may be enhanced by the modification shown in Fig. 11. In this form of device a short circuited coil 21' is wound on the end of the magnet 20 and disposed between the poles of a permanent magnet 29.

It will be apparent that the position of armature element 14 on its small arcuate path about the pivot 15, between stops 17 and 18 may be utilized to develop or control a signal related to its instantaneous position by any desired system, as, for instance, by controlling the bleed rate of a pneumatic system, as shown in Fig. 3, for instance, and useable with all forms of the device with armature 14 or an extension thereof forming a flapper movable toward and away from a bleed nozzle 39, which controls the instrument air pressure of an associated pneumatic system as is well known in the art, in which with minute flapper movements, a substantially linear change of pressure in the nozzle follows a given change in flapper position. It is presently preferred to utilize electrical means for the purpose and specifically to utilize a signal device having such inappreciable frictional or other resistance effects as to impose negligible load on the movements and positioning of the element 14. A movable element transformer is presently preferred for the purpose as manifested illustratively by a differential transformer 30, having a primary 31 energized by a suitable source of A. C., and secondaries 32 and 33 in effectively bucking relation, as taught, for instance, in Macgeorge Patent No. 2,568,587, with an armature 34 mounted on a rod 35 projecting from the element 14 and movable therewith. Any equivalent electrical device may be so disposed, to the end that a signal appears in output leads 36 and 37 proportional to the movement of the armature element 14.

With the differential transformer disclosed, it will usually be so disposed and adjusted that there is a substantially null output from the secondaries corresponding to an extreme setting of the armature element 14, at either limit of its swing, so that this constitutes a datum setting from which a proportional signal is developed as a linear function of armature movement. Any other datum setting may be used, as in the mid-position of the armature element 14 from which a signal develops in the output leads 36 and 37 of progressing amplitude and of one phase, or the opposite phase, depending upon the direction or sense of movement of the element 14 from such intermediate datum, and so on. The increase in amplitude from null in one sense is a linear function of the relative displacement of the transformer armature 34 and coils 31, 32, and 33, although the actual physical displacement of such armature may be an extremely minute factor, ranging from a few thousandths of an inch to somewhat greater factors depending upon the particular organization of the transformer used.

It will be apparent that the output of the secondaries 36 and 37 may be used to actuate an indicator, or may be coupled into a null balance circuit incorporating a recorder or the like as shown, for instance in Hornfeck Patents No. 2,330,427 and No. 2,420,539.

Before discussing the functioning of the apparatus, reference may be made to modifications that may be used in the instrument.

Thus, in Fig. 5 the repulsion magnetic elements of Fig. 1 may be replaced, or, as shown in Fig. 4, the repulsion force may be augmented by a carefully calculated spring 40, which may be in either compression or tension, depending upon which side of the armature element 14 it is connected. In either event it has a force urging the armature element 14 away from the tube 10, and is non-linear, and in opposition to the non-linearity of the force of the magnetic couple.

As so far described, the motion of the magnet 11 has been on a linear path, and for most purposes this is the preferred form. However, as shown in Fig. 8, a similar organization can be used to reduce an angular motion. As shown in this figure in a purely illustrative form, a shaft 41 is moved angularly by some force, such as by a variable, or by geared relation to some angularly movable machine part. Presumably, the shaft 41 moves between limits in both directions. Illustratively, the limits may be slightly less than 90° of angularity. The shaft mounts an arm 12', the free end of which mounts a magnet unit 11. A characterized armature element 14', of generally arcuate formation, substantially concentric with the axis of shaft 41, is mounted by flexure means 15' toward one limit of the angular motion of the magnet unit 11. Although in the interests of clarity the stops and balancing components are omitted, it will be understood that by suitable lateral or peripheral extensions of the element 14' and by suitable supports, the adjustable stops 17 and 18 will be provided as will the repulsion magnetic force means disclosed in Fig. 1, or the spring means 40, or both, so disposed as to resist the motion of armature element 14' inwardly toward the shaft 41.

It will be recognized that if the armature 14' of Fig. 8 were a true arc and of uniform proportions, the reaction thereof to the movement of magnet 11 on arm 12' would not be linear, owing to the varying proportions of the components of the forces of the magnetic couple. However, by proper characterizing of the armature, compensation is made for these variations and substantially linear following as a force balance is achieved.

In Figs. 6 and 7, the shaft 41 mounting arm 12' moves the magnet 11 in an arc generally parallel to the plane of the flat armature 14' moving the armature on its flexure pivot 15' proportionally to the angular movement of the shaft, arm, and magnet.

In Figs. 9 and 10 the shaft 41 passes generally normally through the armature 14' with clearance enough to permit motion of the latter on its pivot 15' and the area of same is adequate to permit the arm 12' and magnet 11 to swing through 180°. In effecting such complete arcuate motion of the magnet, it will be clear that the following response of the armature will be as a sine function of the motion.

It will be apparent that various expedients and alternatives may be resorted to which are not specifically disclosed herein, in effecting armature motion as a function of the magnetic coupling whether in pursuance of a linear or of an angular motion, without departing from the principles of the invention.

It will be understood that a major problem with an organization as disclosed lies in the fact that although the urge toward motion of the armature on the flexure pivot would be a direct proportional result of the distance of the magnetic couple from the flexure pivot, if the force of the couple was constant, this is unfortunately not true, as the force of the couple changes inversely as the square of the distance between the magnet and the armature, and the result is that, of itself, the effectiveness of the magnetic couple between the magnet and armature is a non-linear function of the movement of the magnet on its path. It is a feature of this invention to compensate for this non-linearity to effect truly proportional movement of the armature. This compensation is effected by opposing the variable force of the magnetic couple on the armature, by a related non-linearly variable force. In the preferred form, especially for armature movements of relatively large range, the magnets of Fig. 1 or Fig. 3 are preferred. In this form of the invention, as previously noted, the force of repulsion on the armature also varies inversely as the square of the distance between the pole of the magnet 20 moving with the armature and the like pole of the relatively fixed magnet 23, and with careful calibration of the instrument the opposing non-linearities cancel out to effect a positioning of the armature on its pivot which is directly proportional to the position of the path-traveling magnet as a resultant of an instantaneous balance of opposing forces.

An important attribute of the organization of Fig. 1, and the related figures, lies in the damping of the oscillations of the armature 14 or 14' by the disposition of an end of the magnet 20 in or adjacent to the closed coil 21 or as shown in Fig. 11. With all such organizations, changes in level of the magnet 11 or 11' tend to effect oscillations in armature 14 or 14', as do external or other vibrations, and the magnet and coil mentioned damp these out. In this respect, one bar magnet 20 has two unrelated functions of importance in the invention. It will be apparent, of course, that other damping means may be used, and that a separate magnet may be used for damping reaction with a closed coil.

Where the range of movement of the armature is quite small, the non-linear aspects of spring loading with armature movement may be used for effecting the desired resultant proportionality. As indicated in Fig. 4, where desired, the complemental disproportionate attributes of the repulsion magnets and of the spring may be utilized for a resultant proportionality of the armature setting to magnet distance from the horizontal plane of the pivot of the armature (assuming a vertical structure).

It will be apparent that with the parts at rest, and the magnet unit 11 or 11' at its zero setting, its magnetic couple with armature 14 or 14' will be inadequate to move the armature from its abutment against stop 17. Illustratively, at this stopped setting the output of the signal device will be substantially null or at a datum value. At this setting the repulsion magnets will have a certain minimum force value effective on the armature. With change of condition of the variable such as change in the level of the fluid, the float 13, or other variable-responsive element, moves the magnet unit 11 or 11' a given distance from zero. In its course of movement the magnetic couple begins to exert a force on the armature 14 or 14' progressing in effectiveness on the armature functionally with distance from the flexure pivot 15 or 15'. As the armature begins to respond to this force by movement from stop 17, in moving on its pivot toward magnet 11 or 11', the actual force of the magnetic couple increases. However, the repulsion force between magnets 20 and 23 also increases by the same law to hold the armature 14 or 14' to a direct proportion of the movement of the magnet 11 or 11' from zero. The movement of the armature 14 or 14' moves the movable element 34 of the differential transformer 30, or it moves a flapper valve relative to a nozzle, to effect a change in the particular output signal. The functioning in the other sense from a position of the magnet 11 or 11' toward its outer limit in widest spacing from its zero setting will be in reverse of that described, as will be clear.

Having thus described my invention, I claim:

1. A motion reducer comprising a magnet, means for moving said magnet on a predetermined path, an armature generally coextensive with said path having an effective pivot adjacent to one end of said path and movable through a relatively small range toward and away from said path, a first repulsion magnet mounted for movement with said armature, a relatively fixed second repulsion magnet in general alignment with the first repulsion magnet, said repulsion magnets mounted so that contiguous poles have the same polarity, whereby the non-linearly developing force on the armature from the magnetic couple between the magnet moving on said path and said armature is opposed by the non-linearly developing force between the respective repulsion magnets so that the positioning of said armature is as a direct proportion of the movement of said magnet on its said path.

2. A float level signalling device in which the signal is proportional to the instantaneous level of such float, comprising a magnet coupled for movement with such float on a predetermined path, an armature pivoted toward one end of such path and generally coextensive therewith, a second generally fixed magnet, a third magnet mounted for movement with said armature relative to the second magnet, the juxtaposed ends of the second and third magnets having similar polarity, whereby the setting of the armature on its pivot is a function of balance of opposing magnetic forces formed respectively by the magnetic couple between the first magnet and the armature and the repulsion couple formed by the second and third magnets.

3. In magnetic couplings, a magnet, means moving said magnet on a path of movement, armature means juxtaposed to said path, means mounting said armature means for movement relative to said path, said magnet establishing with said armature a magnetic couple the force of which varies inversely as the square of the distance between the magnet and armature, and magnetic repulsion means comprising a relatively fixed magnet and a magnet mounted on the armature having a repulsion force operative on the armature which varies inversely as the square of the distance between them, whereby the armature is positioned relative to said path proportionally to the movement of said magnet movable on its said path.

4. A motion reducer as recited in claim 3, in which the path of movement is arcuate.

5. A motion reducer as recited in claim 3 in which the magnet movable on its path and said relatively fixed magnet are electro-magnets supplied by the same a source of voltage, whereby fluctuations in the voltage from said source are equally effective on both electro-magnets to neutralize the effects of such voltage change and both magnets always have the same relative magnetic values.

6. In magnetic couplings, a first magnet and a force-responsive movable armature comprising elements of a first magnetic couple of given force at a datum relative setting of the magnet and the armature, means for moving the first magnet relative to the other from datum to progressively increase the moment of the couple on the armature to move the same, a second magnet mounted on the armature, a third magnet relatively fixed in spaced alignment with said second magnet, the juxtaposed portions of the second and third magnets having juxtaposed poles so as to exert a magnetic force between them opposing the force of said first couple and increasing as the armature moves from datum, whereby the relative positioning of the armature is as a balance of forces substantially linearly functional with relative movement of said first magnet from datum.

References Cited in the file of this patent

UNITED STATES PATENTS

| | | |
|---|---|---|
| 700,812 | Peyton | May 27, 1902 |
| 1,029,388 | McIntyre | June 11, 1912 |
| 1,668,457 | Kath | May 1, 1928 |
| 2,539,833 | Hathaway | Jan. 30, 1951 |
| 2,614,163 | Roper | Oct. 14, 1952 |
| 2,632,330 | Marchment | Mar. 24, 1953 |
| 2,634,747 | Markson | Apr. 14, 1953 |